United States Patent
Liu et al.

(10) Patent No.: US 11,938,784 B2
(45) Date of Patent: Mar. 26, 2024

(54) HEALTH PROTECTION SYSTEM FOR PASSENGERS ON A TRAIN IN A POLLUTED INDOOR ENVIRONMENT AND METHOD THEREOF

(71) Applicant: Central South University, Hunan (CN)

(72) Inventors: Hui Liu, Hunan (CN); Chao Chen, Hunan (CN); Zhu Duan, Hunan (CN); Yanfei Li, Hunan (CN)

(73) Assignee: Central South University, Hunan (CN)

( * ) Notice: Subject to any disclaimer, the term of this patent is extended or adjusted under 35 U.S.C. 154(b) by 462 days.

(21) Appl. No.: 17/291,995

(22) PCT Filed: Jul. 13, 2020

(86) PCT No.: PCT/CN2020/101736
§ 371 (c)(1),
(2) Date: May 6, 2021

(87) PCT Pub. No.: WO2021/012983
PCT Pub. Date: Jan. 28, 2021

(65) Prior Publication Data
US 2021/0291614 A1    Sep. 23, 2021

(30) Foreign Application Priority Data
Jul. 25, 2019 (CN) .......... 201910676726.X

(51) Int. Cl.
*B60H 1/00* (2006.01)
*B60H 3/00* (2006.01)
*B61D 27/00* (2006.01)

(52) U.S. Cl.
CPC ........ *B60H 1/0073* (2019.05); *B60H 1/008* (2013.01); *B60H 1/00828* (2013.01);
(Continued)

(58) Field of Classification Search
CPC .............. B60H 1/0073; B60H 1/008; B60H 1/00828; B60H 3/0085; B61D 27/009; B60Y 2200/30
(Continued)

(56) References Cited

FOREIGN PATENT DOCUMENTS

| CN | 1885040 | 12/2006 |
|---|---|---|
| CN | 106975279 | 7/2017 |

(Continued)

OTHER PUBLICATIONS

"International Search Report (Form PCT/ISA/210) of PCT/CN2020/101736," dated Sep. 16, 2020, pp. 1-4.

*Primary Examiner* — Allen R. B. Schult
(74) *Attorney, Agent, or Firm* — JCIP GLOBAL INC.

(57) ABSTRACT

A health protection system and a method for passengers on a train in a polluted indoor environment are provided. The health protection system includes a basic data acquisition module, an outdoor air quality prediction module, an indoor air quality prediction module, and a ventilation strategy generation module, wherein the basic data acquisition module acquires basic data; the outdoor air quality prediction module predicts outdoor air quality of the train; the indoor air quality prediction module predicts indoor air quality of the train; and the ventilation strategy generation module generates a ventilation strategy and achieves health protection of the passengers on the train. The method includes: predicting indoor and outdoor air quality data information of the train according to the acquired indoor and outdoor air quality data of the train; and generating a corresponding ventilation strategy according to the indoor and outdoor air quality data of the train.

8 Claims, 2 Drawing Sheets

(52) U.S. Cl.
 CPC ......... *B60H 3/0085* (2013.01); *B61D 27/009* (2013.01); *B60Y 2200/30* (2013.01)
(58) Field of Classification Search
 USPC .......................................................... 454/75
 See application file for complete search history.

(56) References Cited

FOREIGN PATENT DOCUMENTS

| | | |
|---|---|---|
| CN | 107167178 | 9/2017 |
| CN | 105172818 | 2/2018 |
| CN | 108263409 | 7/2018 |
| CN | 109655107 | 4/2019 |
| CN | 110239577 | 9/2019 |
| KR | 20190001219 | 1/2019 |

12 # HEALTH PROTECTION SYSTEM FOR PASSENGERS ON A TRAIN IN A POLLUTED INDOOR ENVIRONMENT AND METHOD THEREOF

CROSS-REFERENCE TO RELATED APPLICATION

This application is a 371 of international application of PCT application serial no. PCT/CN2020/101736, filed on Jul. 13, 2020, which claims the priority benefit of China application no. 201910676726.X, filed on Jul. 25, 2019. The entirety of each of the above mentioned patent applications is hereby incorporated by reference herein and made a part of this specification.

BACKGROUND

Technical Field

The present invention specifically relates to a health protection system for passengers on a train in a polluted indoor environment and a method thereof.

Description of Related Art

With the development of technology and the improvement of people's standards of living, transportation has become one of the most important components of modern society. And with the development of technology, the railway industry in China has also been greatly developed.

Train ventilation is one of the important means to guarantee normal operation of a train and to ensure comfort of passengers thereon. With the increasing emphasis on reducing environmental pollution and the continued concern for health, environmental pollution inside a train has also been brought to public attention.

At present, since nearly all train carriages in China are enclosed, pollutants such as PM2.5 and the like therein are not easy to be purified. In general, only a simple ventilation system is arranged on existing train carriages to filter large particulate pollutants, and neither passenger health early warning systems nor high-efficiency air purifying devices are configured. When a train stops at a station, air pollutants may directly enter and remain in the carriages of the train through open doors, causing a serious threat to the health of passengers thereon.

According to current technologies, health protection of passengers on a train (a train ventilation strategy) is mainly achieved by installing novel vehicle-mounted air purifying apparatuses. For example, the patent with the publication number of 105172818B provides a special air purifier for trains, which comprises an upper box body, and a lower box body matching with the upper box body. The patent with the publication number of 106975279A provides an air purifying apparatus, system and method for high-speed trains, and the air purifying apparatus comprises an air inlet passage and a filter screen assembly. These methods purify air pollutants inside a train by installing expensive novel air purifying devices, resulting in a relatively high implementation cost.

SUMMARY

One purpose of the present invention is to provide a health protection system for passengers on a train in a polluted indoor environment, which can generate a ventilation strategy for each carriage of the train according to an actual situation so as to achieve health protection of the passengers on the train.

The second purpose of the present invention is to provide a method used by the health protection system for passengers on a train in a polluted indoor environment.

The health protection system for passengers on a train in a polluted indoor environment provided by the present invention comprises: a basic data acquisition module, an outdoor air quality prediction module, an indoor air quality prediction module and a ventilation strategy generation module; wherein an output end of the basic data acquisition module is connected with an input end of the outdoor air quality prediction module and an input end of the indoor air quality prediction module simultaneously; an output end of the outdoor air quality prediction module and an output end of the indoor air quality prediction module are both connected with the ventilation strategy generation module; the basic data acquisition module is configured to acquire air quality data and position information of an air quality monitoring station and indoor and outdoor pollutant data information of the train; the outdoor air quality prediction module is configured to predict outdoor air quality data of the train; the indoor air quality prediction module is configured to predict indoor air quality data of the train; and the ventilation strategy generation module is configured to generate a ventilation strategy according to indoor and outdoor air quality prediction data of the train, thereby achieving health protection of the passengers on the train.

The present invention also provides a method used by the health protection system for passengers on a train in a polluted indoor environment, which comprises the following steps:

S1. acquire data information of each air quality monitoring station and corresponding air quality monitoring data;

S2. acquire pollutant data information and position information of the train;

S3. predict air quality of an area where the train is located according to the position information of the train, the data information of each air quality monitoring station, and the corresponding air quality monitoring data;

S4. model indoor and outdoor air quality of the train;

S5. predict, according to predicted results of the steps S3 and S4, the indoor and outdoor air quality of the train at a future moment; and S6. generate, according to a predicted result of the step S5, a ventilation strategy of each carriage of the train.

The step of acquiring data information of each air quality monitoring station and corresponding air quality monitoring data in the step S1 is, specifically, to acquire code information of the air quality monitoring station, longitude and latitude information of the air quality monitoring station, and concentrations of PM2.5, PM10, CO, $NO_2$, $SO_2$ and $O_3$ and an AQI parameter value monitored by the air quality monitoring station.

The step of acquiring pollutant data information and position information of the train in the step S2 is, specifically, to acquire concentrations of PM2.5, PM10, CO, $NO_2$, $SO_2$ and $O_3$ and a serial number of a carriage of the train, and concentrations of PM2.5, PM10, CO, $NO_2$, $SO_2$ and $O_3$ outside each carriage of the train, longitude and latitude information of each carriage of the train, an average speed per minute of the train in past several minutes, and a directed path of a remaining running route of the train.

The step of predicting air quality of an area where the train is located in the step S3 is, specifically, to perform prediction in the following steps:
A. calculate a historical distance between the train and each air quality monitoring station according to position information of the train at t historical moments and position information of the air quality monitoring station;
B. calculate a predicted position of the train after future T minutes;
C. calculate a predicted distance between the train and each air quality monitoring station after the T minutes;
D. calculate a real-time distance between the train and each air quality monitoring station, select a plurality of air quality monitoring stations with the least real-time distance as a minimum space unit of an area passed by the train, and record air quality monitoring data corresponding to the plurality of air quality monitoring stations selected;
E. record historical distances between the plurality of air quality monitoring stations selected in the step D and the train, and establish a pollutant diffusion model in the minimum space unit; and
F. predict the air quality of the area where the train is located after the T minutes according to the pollutant diffusion model in the minimum space unit obtained in the step E and the predicted distance between the train and each air quality monitoring station after the T minutes obtained in the step C.

The step of calculating a predicted position of the train after future T minutes in the step B is, specifically, to calculate the predicted position of the train by using the following equation:

$$LOC_T^C = [LOT^C + T \times v \times \vec{r}_{LOT}, LAT^C + T \times v \times \vec{r}_{LAT}]$$

wherein, $LOC_T^C$ is the predicted position of the train after the future T minutes, $LOT^C$ is longitude information of a current position of the train, v is the average speed per minute of the train in past several minutes, $\vec{r}_{LOT}$ is longitude component data of the directed path of the remaining running route of the train, $LAT^C$ is latitude information of the current position of the train, and $\vec{r}_{LAT}$ is latitude component data of the directed path of the remaining running route of the train.

The step of establishing a pollutant diffusion model in the minimum space unit in the step E is, specifically, to use a weighted regularization extreme learning machine as the pollutant diffusion model in the minimum space unit; an input of the model is a distance between the train at each historical moment and each air quality monitoring station, and the air quality monitoring data corresponding to each air quality monitoring station; and an output of the model is pollutant data information of a position where the train is located at each historical moment.

The step of modeling indoor and outdoor air quality of the train in the step S4 is, specifically, to model in the following steps:
a. continuously read indoor pollutant data information and outdoor pollutant data information of the train at a plurality of continuous moments;
b. divide the pollutant data information acquired in the step a into a training set and a verification set;
c. analyze and calculate self-relevance of the indoor pollutant data information of the train; and
d. establish a deep learning model of a deterministic mapping relationship between indoor pollutant concentrations and outdoor pollutant concentrations of the train.

The step of analyzing and calculating self-relevance of the indoor pollutant data information of the train in the step c is, specifically, to analyze the self-relevance in the following steps:
(1) calculate mutual information between every two of all air pollutants inside the train by using the following equation:

$$MI(a_i; b_i) = \sum_{A \in a_i} \sum_{B \in b_i} P(A, B) \log \frac{P(A, B)}{P(A)P(B)} = H(a_i) - H(a_i | b_i)$$

wherein, $MI(a_i; b_i)$ is a result of mutual information between a pollutant a and a pollutant b; a sequence of the pollutant a is recorded as $\{a_i | i=1, 2, \ldots, X\}$, and a sequence of the pollutant b is recorded as $\{b_i | i=1, 2, \ldots, X\}$; $P(A, B)$ is a joint probability distribution function of random variables $a_i$ and $b_1$, $P(A)$ is a marginal probability distribution function of $a_i$, $P(B)$ is a marginal probability distribution function of $b_i$, $H(a_1)$ is a marginal entropy, and $H(a_i|b_i)$ is a conditional entropy;
(2) construct, according to the mutual information between every two of all air pollutants calculated in the step (1), mutual information sets of the pollutants; and
(3) select, for each pollutant, a plurality of groups of pollutants with the maximum mutual information of the pollutant, wherein the selected plurality of groups of pollutants have the strongest relevance.

The step of establishing a deep learning model of a deterministic mapping relationship between indoor pollutant concentrations and outdoor pollutant concentrations of the train in the step d is, specifically, to train, for each pollutant, a stacked long short-term memory network model by taking data information of the pollutant outside the train in the training set and data information of the plurality of groups of pollutants with the maximum mutual information of the pollutant selected in the step c as an input of the stacked long short-term memory network model and by taking data information of the pollutant inside the train in the training set as an output of the stacked long short-term memory network model, thereby obtaining the deep learning model of the deterministic mapping relationship between the indoor pollutant concentrations and the outdoor pollutant concentrations of the train.

The number of neurons in each layer of the stacked long short-term memory network model is obtained by optimization of a firefly algorithm, specifically comprising the following steps:
1) determine a fitness function;
2) perform initialization setting on the algorithm;
3) arrange and archive all fireflies by fitness;
4) screen out an optimal firefly from a group as an individual leader; and
5) determine a search frequency:
   if the search frequency meets a requirement, finish the algorithm and output an optimal solution to determine the number of optimal neurons of the stacked long short-term memory network model; and
   if the search frequency does not meet the requirement, repeat the steps 3)-5) until the search frequency meets the requirement.

The step of generating a ventilation strategy of each carriage of the train in the step S6 is, specifically, to generate the ventilation strategy in the following rules:

if $AO<\min(AI_R)$, it is deemed that an indoor air pollution degree of the train is lower than an outdoor air pollution degree of the train, and then an outdoor air circulating ventilation system is stopped and an indoor air circulating filtering apparatus is started, thereby preventing outdoor air from causing secondary pollution to an indoor environment of the carriage;

if $AO>\max(AI_R)$, it is deemed that the indoor air pollution degree of the train is higher than the outdoor air pollution degree of the train, and then the outdoor air circulating ventilation system is started and the indoor air circulating filtering apparatus is stopped; and for any carriage, if it is determined that $AI_e>AI_{e+1}$ and $AI_e>AI_{e-1}$, it is deemed that an air pollution degree of a carriage e is higher than that of an adjacent carriage, and then air filtering strength of a ventilation system of the carriage adjacent to the carriage e is improved to reduce cross pollution between different carriages and to accelerate flowing and discharging of air pollutants out of the train; and if $\min(AI_R)<AO<\max(AI_R)$, it is deemed that the air pollution degree of some carriages is higher than the outdoor air pollution degree while the air pollution degree of still some carriages is lower than the outdoor air pollution degree; and then the outdoor air circulating ventilation systems of the carriages with the air pollution degree higher than the outdoor air pollution degree are started; and meanwhile, the outdoor air circulating ventilation systems of the carriages with the air pollution degree lower than the outdoor air pollution degree are stopped, and the indoor air circulating filtering apparatuses of the carriages with the air pollution degree lower than the outdoor air pollution degree are started;

wherein, AO is a predicted result of outdoor AQI of the train, and $AI_R$ is a predicted result of indoor AQI of the R-th carriage of the train.

The present invention also provides a system for implementing a train ventilation method based on indoor and outdoor environment pollutant monitoring of a train.

By the health protection system for passengers on a train in a polluted indoor environment and method thereof provided by the present invention, indoor and outdoor air quality data information of the train is predicted according to acquired indoor and outdoor air quality data of the train, and a corresponding ventilation strategy is generated according to a predicted result; therefore, the method provided by the present invention can be used for predicting indoor and outdoor air quality data of the train and generating a ventilation strategy with high reliability and good accuracy.

DESCRIPTION OF THE EMBODIMENTS

Figure 1:
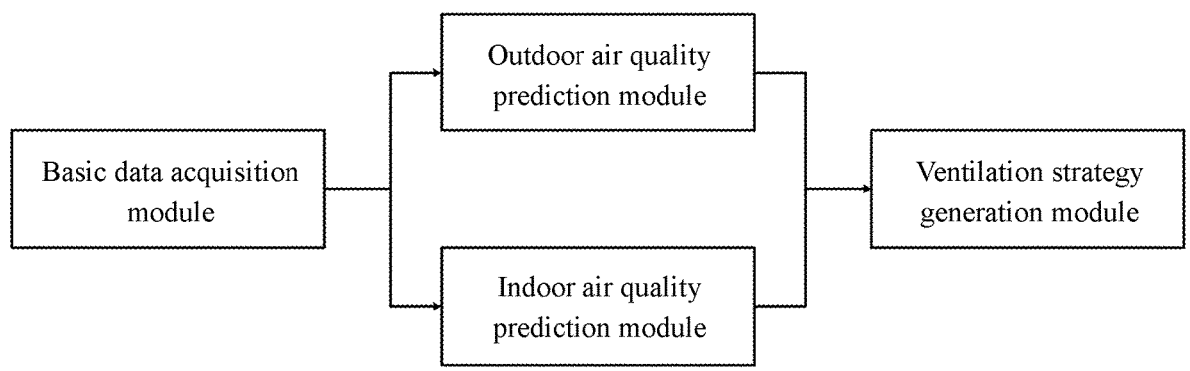
FIG. 1 is a functional module diagram of the system according to the present invention.
Figure 2:
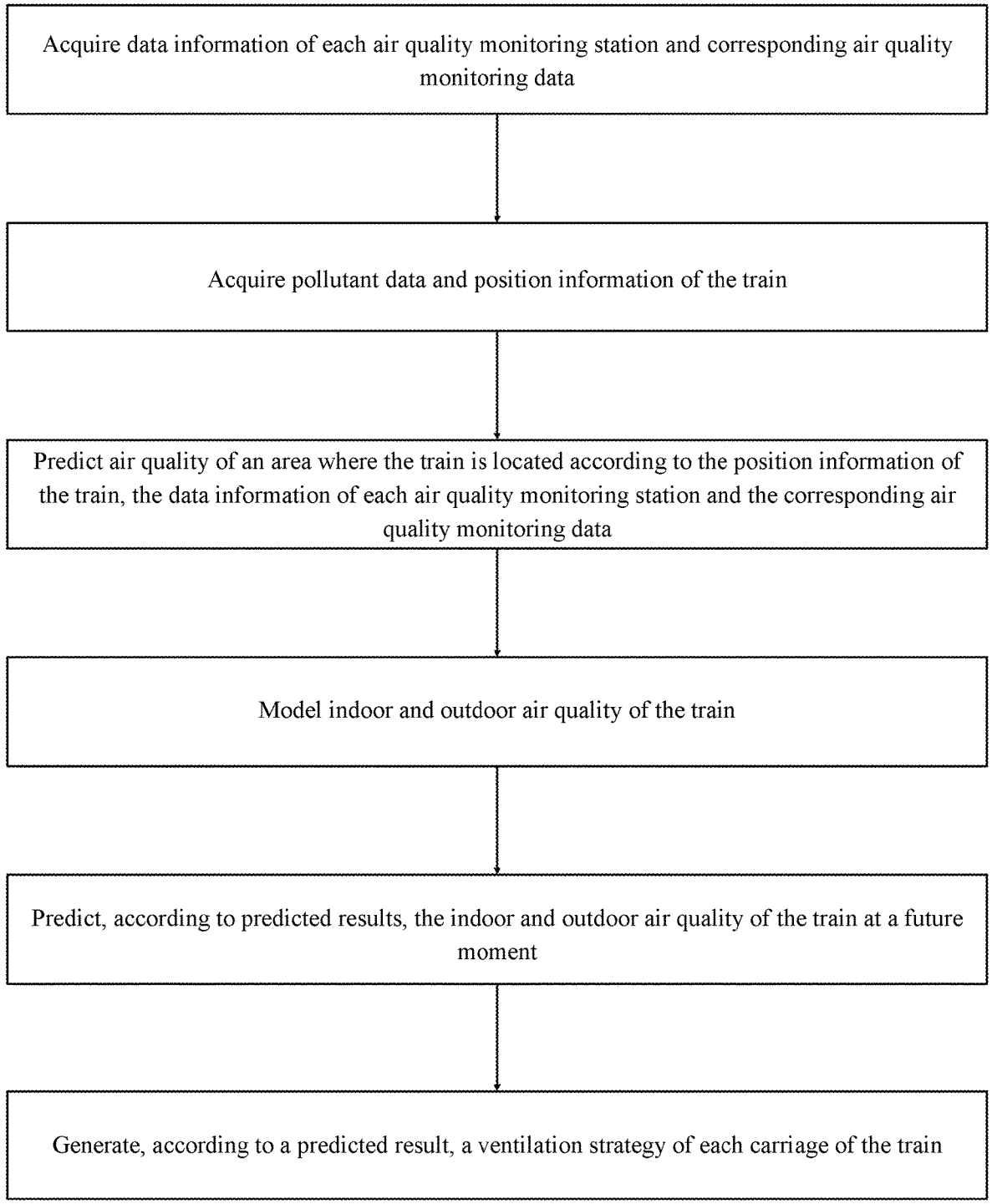
FIG. 2 is a flowchart of the method according to the present invention.

As shown in the functional module diagram of the system according to the present invention in FIG. 1: the health protection system for passengers on a train in a polluted indoor environment provided by the present invention comprises: a basic data acquisition module, an outdoor air quality prediction module, an indoor air quality prediction module and a ventilation strategy generation module; wherein an output end of the basic data acquisition module is connected with an input end of the outdoor air quality prediction module and an input end of the indoor air quality prediction module simultaneously; an output end of the outdoor air quality prediction module and an output end of the indoor air quality prediction module are both connected with the ventilation strategy generation module; the basic data acquisition module is configured to acquire air quality data and position information of an air quality monitoring station and indoor and outdoor pollutant data information of the train; the outdoor air quality prediction module is configured to predict outdoor air quality data of the train; the indoor air quality prediction module is configured to predict indoor air quality data of the train; and the ventilation strategy generation module is configured to generate a ventilation strategy according to indoor and outdoor air quality prediction data of the train, thereby achieving health protection of the passengers on the train.

As shown in the flowchart of the method according to the present invention: the present invention also provides a method used by the health protection system for passengers on a train in a polluted indoor environment, which comprises the following steps:

S1. acquire data information of each air quality monitoring station and corresponding air quality monitoring data; specifically, it is to acquire code information of the air quality monitoring station, longitude and latitude information of the air quality monitoring station, and concentrations of PM2.5, PM10, CO, $NO_2$, $SO_2$ and $O_3$ and an API parameter value monitored by the air quality monitoring station;

in specific implementations, an incremental Web crawler is used for crawling and monitoring a data update situation of the China National Urban Air Quality Real-time Publishing Platform; the crawling period is set to be the time difference between two updates of the same url on the platform, namely 1 hour; and a station-level air quality data acquisition module analyzes the national air pollutant indexes published at each hour, including concentrations of PM2.5, PM10, CO, $NO_2$, $SO_2$ and $O_3$ and AQIs of different monitoring stations, which can be specifically expressed by a matrix, namely, $D_T^N=[C_{PM2.5}, C_{PM10}, C_{CO}, C_{NO2}, C_{SO2}, C_{O3}, AQI]_T^N$; moreover, first it is determined whether the crawled content is repeated or not, and if not, the data is saved on a data storage platform in a final storage format of $S_T^N=[C_{PM2.5}, C_{PM10}, C_{CO}, C_{NO2}, C_{SO2}, C_{O3}, AQI, Code, LOT^S, LAT^S]_T^N$, wherein Code is the code of the monitoring station, $LOT^S$ is the longitude of the monitoring station, and $LAT^S$ is the latitude of the monitoring station; and furthermore, each piece of monitoring data needs to correspond to the code, longitude and latitude of each monitoring station, a timestamp of each piece of monitoring data is recorded, and the interval between adjacent data is acquisition time interval data, which can be selected as 1 hour;

S2. acquire pollutant data information and position information of the train; specifically, it is to acquire concentrations of PM2.5, PM10, CO, $NO_2$, $SO_2$ and $O_3$ and a serial number of a carriage of the train, and concentrations of PM2.5, PM10, CO, $NO_2$, $SO_2$ and $O_3$ outside each carriage of the train, longitude and latitude information of each carriage of the train, an average speed per minute of the train in past several minutes, and a directed path of a remaining running route of the train;

in specific implementations, a vehicle-mounted real-time pollutant data acquisition module is installed on a carriage of the train, comprising an indoor air data acquisition sub-module and an outdoor air data acquisition sub-module, with each composed of a particulate matter concentration detection sensor (for acquiring concentrations of PM2.5 and PM10) and a gas sensor (for acquiring gases and analyzing compositions of CO, $NO_2$, $SO_2$ and $O_3$);

for the inside of the train, a sensor group is installed on the middle roof of each carriage, the sampling time interval of each index is 5 minutes, and the acquired data is transmitted to a vehicle-mounted data storage platform in a 4G mode through a wireless transmission apparatus. Related indoor pollutant indexes of the train comprise concentrations of PM2.5, PM10, CO, $NO_2$, $SO_2$ and $O_3$ at T continuous moments, which can be expressed by a matrix, specifically as $I_T=[C_{PM2.5}^I, C_{PM10}^I, C_{CO}^I, C_{NO2}^I, C_{SO2}^I, C_{O3}^I]_T$, and are stored in a final storage format of $FI_T=[C_{PM2.5}^I, C_{PM10}^I, C_{CO}^I, C_{NO2}^I, C_{SO2}^I, C_{O3}^I, R]_T$, wherein R is the code of the train; and for the outside of the train, a sensor group is installed at the middle outside each carriage, a sampling time interval of each index is 5 minutes, and the acquired data is transmitted to the vehicle-mounted data storage platform in the 4G mode through the wireless transmission apparatus. Different from the indoor air data acquisition sub-module, a protective cover is additionally arranged outside the sensor group, thereby reducing influences of an excessive air flow rate on sensor acquisition when the train is running; and related outdoor pollutant indexes of the train comprise concentrations of PM2.5, PM10, CO, $NO_2$, $SO_2$ and $O_3$ at the T continuous moments, which can be expressed as $O_T=[C_{PM2.5}^O, C_{PM10}^O, C_{CO}^O, C_{NO2}^O, C_{SO2}^O, C_{O3}^O]_T$, and are stored in a final storage format of $FO_T=[C_{PM2.5}^O, C_{PM10}^O, C_{CO}^O, C_{NO2}^O, C_{SO2}^O, C_{O3}^O, R]_T$, wherein R is the code of the train; and each piece of monitoring data needs to correspond to the serial number of the carriage, a timestamp of each piece of monitoring data is recorded, and the interval between adjacent data interval is acquisition time interval data, preferably 5 minutes;

S3. predict air quality of an area where the train is located according to the position information of the train, the data information of each air quality monitoring station and the corresponding air quality monitoring data; specifically, it is to predict the air quality in the following steps:

A. calculate a historical distance between the train and each air quality monitoring station according to position information of the train at t historical moments and position information of the air quality monitoring station;

the formula for calculating the historical distance is:

$$d_t^m = \sqrt{(LOT_t^C - LOT_t^{S,m})^2 + (LAT_t^C - LAT_t^{S,m})^2};$$

B. calculate a predicted position of the train after future T minutes; specifically, it is to calculate the predicted position of the train by using the following equation:

$$LOC_T^C = [LOT^C + T \times v \times \vec{r}_{LOT}, LAT^C + T \times v \times \vec{r}_{LAT}]$$

wherein, $LOC_T^C$ is the predicted position of the train after the future T minutes, $LOT^C$ is longitude information of a current position of the train, v is the average speed per minute of the train in past several minutes, $\vec{r}_{LOT}$ is longitude component data of the directed path of the remaining running route of the train, $LAT^C$ is latitude information of the current position of the train, and $\vec{r}_{LAT}$ is latitude component data of the directed path of the remaining running route of the train;

C. calculate a predicted distance between the train and each air quality monitoring station after the T minutes;

D. calculate a real-time distance between the train and each air quality monitoring station, select a plurality of air quality monitoring stations with the least real-time distance as a minimum space unit of an area passed by the train, and record air quality monitoring data corresponding to the plurality of air quality monitoring stations selected;

in specific implementations, three monitoring stations ε1, ε2 and ε3 with the least distance are selected as the minimum space units of the area passed by the train, and the codes Code1, Code2 and Code3 of the monitoring stations are recorded; moreover, the codes are aligned with real-time monitoring records on the data storage platform, and concentrations of PM2.5, PM10, CO, $NO_2$, $SO_2$ and $O_3$ and an AQI set $D_t^{ε1,ε2,ε3} = [C_{PM2.5}, C_{PM10}, C_{CO}, C_{NO2}, C_{SO2}, C_{O3}, AQI]_t^{ε1,ε2,ε3}$ of the three monitoring stations at t continuous historical moments are read;

E. record historical distances between the plurality of air quality monitoring stations selected in the step D and the train, and establish a pollutant diffusion model in the minimum space unit; specifically, it is to use a weighted regularization extreme learning machine as the pollutant diffusion model in the minimum space unit; an input of the model is a distance between the train at each historical moment and each air quality monitoring station, and the air quality monitoring data corresponding to each air quality monitoring station; and an output of the model is pollutant data information of a position where the train is located at each historical moment;

in specific implementations, the number of hidden layer neurons of the weighted regularization extreme learning machine is set as 25 and the regularization term coefficient is set as $2^{-10}$ to obtain a well-trained pollutant diffusion model;

F. predict the air quality of the area where the train is located after the T minutes according to the pollutant diffusion model in the minimum space unit obtained in the step E and the predicted distance between the train and each air quality monitoring station after the T minutes obtained in the step C;

in specific implementations, the input of the weighted regularization extreme learning machine is updated according to a predicted distance index set $Distance_T = [d_T^1, d_T^2, d_T^3, \ldots, d_T^N]$ to calculate the outdoor air pollutant concentrations of the train after T moments;

S4. model indoor and outdoor air quality of the train; specifically, it is to model in the following steps:

a. continuously read indoor pollutant data information and outdoor pollutant data information of the train at a plurality of continuous moments;

b. divide the pollutant data information acquired in the step a into a training set and a verification set;

c. analyze and calculate self-relevance of the indoor pollutant data information of the train; specifically, it is to analyze the self-relevance in the following steps:

(1) calculate, by using the following equation, mutual information between every two of all air pollutants inside the train:

$$MI(a_i; b_i) = \sum_{A \in a_i} \sum_{B \in b_i} P(A, B) \log \frac{P(A, B)}{P(A)P(B)} = H(a_i) - H(a_i | b_i)$$

wherein, $MI(a_i; b_j)$ is a result of mutual information between a pollutant a and a pollutant b; a sequence of the pollutant a is recorded as $\{a_i | i=1, 2, \ldots, X\}$, and a sequence of the pollutant b is recorded as $\{b_i | i=1, 2, \ldots, X\}$; $P(A,B)$ is a joint probability distribution function of random variables $a_i$ and $b_1$, $P(A)$ is a marginal probability distribution function of $a_i$, $P(B)$ is a marginal probability distribution function of $b_i$, $H(a_1)$ is a marginal entropy, and $H(a_i | b_i)$ is a conditional entropy;

(2) construct, according to the mutual information between every two of all air pollutants calculated in the step (1), mutual information sets of the pollutants, as shown in the following expression:

$$\begin{bmatrix} MI(PM2.5; PM10), MI(PM2.5; CO), MI(PM2.5; NO2), MI(PM2.5; SO2) \\ MI(PM2.5; O3)MI(PM10; CO), MI(PM10; NO2), MI(PM10; SO2) \\ MI(PM10; O3), MI(CO; NO2), MI(CO; SO2), MI(CO; O3) \\ MI(NO2; SO2), MI(NO2; O3), MI(SO2; O3) \end{bmatrix}$$

(3) select, for each pollutant, a plurality of groups of pollutants with the maximum mutual information of the pollutant, wherein the selected plurality of groups of pollutants have the strongest relevance;

in specific implementations, the mutual information sets related to each pollutant index are sorted in descending order, and three groups of pollutant relationships with the maximum mutual information are selected and recorded as $\Omega 1, \Omega 2, \Omega 3$, wherein the relevance of the pollutant index sequences is the strongest;

d. establish a deep learning model of a deterministic mapping relationship between indoor pollutant concentrations and outdoor pollutant concentrations of the train; specifically, it is to train, for each pollutant, a stacked long short-term memory network model by taking data information of the pollutant outside the train in the training set and data information of the plurality of groups of pollutants with the maximum mutual information of the pollutant selected in the step c as an input of the stacked long short-term memory network model and by taking data information of the pollutant inside the train in the training set as an output of the stacked long short-term memory network model, thereby obtaining the deep learning model of the deterministic mapping relationship between the indoor pollutant concentrations and the outdoor pollutant concentrations of the train;

in specific implementations, a four-layer stacked long short-term memory network model structure is used, taking an output vector of each layer as an input of the next layer to learn a deep characteristic representation of the data;

and meanwhile, the number of neurons in each layer is obtained by optimization of a firefly algorithm, specifically comprising the following steps:

1) determine a fitness function;

in specific implementations, a long short-term memory network is required to be constructed for each individual in a firefly group, and the long short-term memory network acquires a predicted result on the verification set. For achieving balance between model complexity and precision, weighted combination of the number of neurons and a predicted mean square error (MSE) is taken as a fitness function for evaluating each firefly, and is set as a minimization optimization problem to determine a search direction, with the fitness function as follows:

$$\text{fitness} = \sum_{i=1}^{4} \alpha_i \varepsilon_i + MSE = \sum_{i=1}^{4} \alpha_i \varepsilon_i + \frac{1}{N} \sum_{t=1}^{10} (f(t) - Y(t))$$

wherein, fitness is the fitness function, $\alpha_i$ is a combination weight, $\varepsilon_i$ is the number of neurons in the i layer of the stacked long short-term memory network, f(t) is a predicted result acquired by the stacked long short-term memory network on the verification set, and Y(t) is actual verification set data;

2) perform initialization setting on the algorithm;

in specific implementations, a value range of fireflies is set as [20,100], the number of groups is set as 200, and an iteration threshold is set as 100. The fitness of each firefly is calculated by randomly initializing 200 fireflies as the number of neurons of the stacked long short-term memory network model;

3) arrange and archive all fireflies by fitness;

4) screen out an optimal firefly from a group (by the roulette wheel selection method) as an individual leader;

5) determine a search frequency:

if the search frequency meets a requirement, finish the algorithm and output an optimal solution to determine the number of optimal neurons of the stacked long short-term memory network model; and if the search frequency does not meet the requirement, repeat the steps 3)-5) until the search frequency meets the requirement.

A learning model of a deterministic mapping relationship between indoor concentrations of and outdoor concentrations of PM2.5, PM10, CO, $NO_2$, $SO_2$ and $O_3$ of the train is established based on the stacked long short-term memory network according to the above-described steps;

S5. predict, according to predicted results of the steps S3 and S4, the indoor and outdoor air quality of the train at a future moment; and S6. generate, according to a predicted result of the step S5, a ventilation strategy of each carriage of the train; specifically, it is to generate the ventilation strategy in the following rules:

if AO<min($AI_R$), it is deemed that an indoor air pollution degree of the train is lower than an outdoor air pollution degree of the train, and then an outdoor air circulating ventilation system is stopped and an indoor air circulating filtering apparatus is started, thereby preventing outdoor air from causing secondary pollution to an indoor environment of the carriage;

if AO>max($AI_R$), it is deemed that the indoor air pollution degree of the train is higher than the outdoor air pollution degree of the train, and then the outdoor air circulating ventilation system is started and the indoor air circulating filtering apparatus is stopped; and for any carriage, if it is determined that $AI_e>AI_{e+1}$ and $AI_e>AI_{e-1}$, it is deemed that an air pollution degree of a carriage e is higher than that of an adjacent carriage, and then air filtering strength of a ventilation system of the carriage adjacent to the carriage e is improved to reduce cross pollution between different carriages and to accelerate flowing and discharging of air pollutants out of the train; and if min($AI_R$)<AO<max($AI_R$), it is deemed that the air pollution degree of some carriages is higher than the outdoor air pollution degree while the air pollution degree of still some carriages is lower than the outdoor air pollution degree; and then the outdoor air circulating ventilation systems of the carriages with the air pollution degree higher than the outdoor air pollution degree are started; and meanwhile, the outdoor air circulating ventilation systems of the carriages with the air pollution degree lower than the outdoor air pollution degree are stopped, and the indoor air circulating filtering apparatuses of the carriages with the air pollution degree lower than the outdoor air pollution degree are started;

wherein, AO is a predicted result of outdoor AQI of the train, and $AI_R$ is a predicted result of indoor AQI of the R-th carriage of the train.

In addition, after completing generation of the ventilation strategy, each monitoring station continuously detects the air quality index and uploads it to a control end. Especially, within a period of time after a first training is completed, the model does not need to be re-trained and only needs to be predicted according to updated data; meanwhile, due to diffusion effects of air pollutants and occurrence of extreme weather conditions, the model needs to be regularly re-trained to ensure the accuracy of early warning, and the time interval of re-training is set as 1 hour.

According to the health protection system for passengers on a train in a polluted indoor environment and method thereof provided by the present invention, the station-level air quality data acquisition module crawls real-time updated monitoring data of the China National Environmental Monitoring Center by using an incremental network crawler; and the crawling period is set to be the time difference between two updates of the same url on the China National Urban Air Quality Real-time Publishing Platform, thereby analyzing the national air pollutant indexes published at each hour. By mastering pollutant indexes of the monitoring stations surrounding the forward running area of the train according to spatial distribution of the monitoring stations, and by sufficiently taking advantage of existing urban pollutant monitoring data, the method plays a guiding role in early warning of air pollution conditions of train operation.

The present invention provides an outside-train area air pollutant diffusion model of a minimum space unit, which combines indexes such as train-station real-time distance, pollutant concentrations measured by monitoring stations, pollutant concentrations on the train side, train running route and the like, and determines the outdoor air pollutant concentration diffusion situation of the train after a certain moment, thereby providing a spatially related data set for analyzing the outdoor atmospheric environment of the train.

The present invention provides a deterministic modeling method for indoor pollutant concentrations and outdoor pollutant concentrations of a train, comprising installing sensor groups inside and outside a carriage of the train, sampling air pollutant concentrations in real time, and establishing a stacked long short-term memory network to learn a deterministic relationship between the indoor pollutant concentrations and the outdoor pollutant concentrations of the train.

Based on an outdoor air pollutant diffusion result of the train and a deterministic relationship between the indoor pollutant concentrations and the outdoor pollutant concentrations of the train, the indoor pollutant concentrations of the train after a certain moment are predicted, and the difference between the indoor and outdoor air quality of the train and the difference between the air quality of different carriages of the train are determined so as to select different ventilation protection solutions according to different pollution situations, and to avoid cross pollution among different carriages and secondary pollution inside the train due to serious air pollution outside the train; and after a ventilation strategy is generated by the method provided by the present invention, the health of all passengers on the train can be protected to a certain extent.

What is claimed is:

1. A health protection method for passengers on a train in a polluted indoor environment, which is implemented by a health protection system for the passengers on the train in the polluted indoor environment, wherein the health protection system comprises: a basic data acquisition circuit, an outdoor air quality prediction circuit, an indoor air quality prediction circuit and a ventilation strategy generation circuit; wherein an output end of the basic data acquisition circuit is connected with an input end of the outdoor air quality prediction circuit and an input end of the indoor air quality prediction circuit simultaneously; an output end of the outdoor air quality prediction circuit and an output end of the indoor air quality prediction circuit are both connected with the ventilation strategy generation circuit; the basic data acquisition circuit is configured to acquire air quality data and position information of an air quality monitoring station and indoor and outdoor pollutant data information of the train; the outdoor air quality prediction circuit is configured to predict outdoor air quality data of the train; the indoor air quality prediction circuit is configured to predict indoor air quality data of the train; and the ventilation strategy generation circuit is configured to generate a ventilation strategy according to indoor and outdoor air quality prediction data of the train, thereby achieving health protection of the passengers on the train; wherein, the health protection method comprises the following steps:

S1. acquire data information of each air quality monitoring station and corresponding air quality monitoring data;

S2. acquire pollutant data information and position information of the train;

S3. predict an air quality of an area where the train is located according to the position information of the train, the data information of the each air quality monitoring station and the corresponding air quality monitoring data; specifically, it is to predict the air quality in the following steps:

A. calculate a historical distance between the train and the each air quality monitoring station according to the position information of the train at t historical moments and position information of the each air quality monitoring station;

B. calculate a predicted position of the train after future T minutes by using the following equation:

$$LOC_T^C = [LOT^C + T \times v \times \vec{r}_{LOT}, LAT^C + T \times v \times \vec{r}_{LAT}]$$

wherein, $LOC_T^C$ is the predicted position of the train after the future T minutes, $LOT^C$ is longitude information of a current position of the train, v is an average speed per minute of the train in past minutes, $\vec{r}_{LOT}$ is longitude component data of a directed path of a remaining running route of the train, $LAT^C$ is latitude information of the current position of the train, and $\vec{r}_{LAT}$ is latitude component data of the directed path of the remaining running route of the train;

C. calculate a predicted distance between the train and the each air quality monitoring station after the T minutes;

D. calculate a real-time distance between the train and the each air quality monitoring station, select a plurality of air quality monitoring stations with a least real-time distance as a minimum space unit of an area passed by the train, and record air quality monitoring data corresponding to the plurality of selected air quality monitoring stations;

E. record historical distances between the plurality of selected air quality monitoring stations in the step D and the train, and establish a pollutant diffusion model in the minimum space unit; specifically, it is to use a weighted regularization extreme learning machine as the pollutant diffusion model in the minimum space unit; an input of the model is a distance between the train at each historical moment and the each air quality monitoring station, and the air quality monitoring data corresponding to the each air quality monitoring station; and an output of the model is pollutant data information of a position where the train is located at each historical moment; and F. predict the air quality of the area where the train is located after the T minutes according to the pollutant diffusion model in the minimum space unit obtained in the step E and the predicted distance between the train and the each air quality monitoring station after the T minutes obtained in the step C;

S4. model an indoor and outdoor air quality of the train;

S5. predict, according to predicted results of the steps S3 and S4, the indoor and outdoor air quality of the train at a future moment; and S6. generate, according to a predicted result of the step S5, a ventilation strategy of each carriage of the train.

2. The health protection method for passengers on a train in a polluted indoor environment according to claim 1, wherein the step of acquiring the data information of the each air quality monitoring station and the corresponding air quality monitoring data in the step S1 is, specifically, to acquire code information of the air quality monitoring station, longitude and latitude information of the air quality monitoring station, and concentrations of PM2.5, PM10, CO, $NO_2$, $SO_2$ and $O_3$ and an AQI parameter value monitored by the air quality monitoring station.

3. The health protection method for passengers on a train in a polluted indoor environment according to claim 2, wherein the step of acquiring the pollutant data information and the position information of the train in the step S2 is, specifically, to acquire concentrations of PM2.5, PM10, CO, $NO_2$, $SO_2$ and $O_3$ and a serial number of a carriage of the train, and concentrations of PM2.5, PM10, CO, $NO_2$, $SO_2$ and $O_3$ outside each carriage of the train, longitude and latitude information of each carriage of the train, the average speed per minute of the train in past minutes, and the directed path of the remaining running route of the train.

4. The health protection method for passengers on a train in a polluted indoor environment according to claim 3, wherein the step of modeling the indoor and outdoor air quality of the train in the step S4 is, specifically, to model in the following steps:

a. continuously read indoor pollutant data information and outdoor pollutant data information of the train at a plurality of continuous moments;

b. divide the indoor pollutant data information and the outdoor pollutant data information acquired in the step a into a training set and a verification set;

c. analyze and calculate self-relevance of the indoor pollutant data information of the train; and d. establish a deep learning model of a deterministic mapping relationship between indoor pollutant concentrations and outdoor pollutant concentrations of the train.

5. The health protection method for passengers on a train in a polluted indoor environment according to claim 4, wherein the step of analyzing and calculating the self-relevance of the indoor pollutant data information of the train in the step c is, specifically, to analyze the self-relevance in the following steps:

(1) calculate, by using the following equation, mutual information between every two of all air pollutants inside the train:

$$MI(a_i; b_j) = \sum_{A \in a_i} \sum_{B \in b_i} P(A, B) \log \frac{P(A, B)}{P(A)P(B)} = H(a_i) - H(a_i | b_i)$$

wherein, $MI(a_i; b_i)$ is a result of mutual information between a pollutant a and a pollutant b; a sequence of the pollutant a is recorded as $\{a_i | i=1, 2, \ldots, X\}$, and a sequence of the pollutant b is recorded as $\{b_i | i=1, 2, \ldots, X\}$; $P(A, B)$ is a joint probability distribution function of random variables $a_i$ and $b_i$, $P(A)$ is a marginal probability distribution function of $a_i$, $P(B)$ is a marginal probability distribution function of $b_i$, $H(a_i)$ is a marginal entropy, and $H(a_i | b_i)$ is a conditional entropy;

(2) construct, according to the mutual information between every two of all air pollutants calculated in the step (1), mutual information sets of the pollutants; and (3) select, for each pollutant, a plurality of groups of pollutants with maximum mutual information of the pollutant, wherein the selected plurality of groups of pollutants have a strongest relevance.

6. The health protection method for passengers on a train in a polluted indoor environment according to claim 5, wherein the step of establishing the deep learning model of the deterministic mapping relationship between the indoor pollutant concentrations and outdoor pollutant concentrations of the train in the step d is, specifically, to train, for each pollutant, a stacked long short-term memory network model by taking the outdoor pollutant data information of the train in the training set and data information of the plurality of groups of pollutants with the maximum mutual information of the pollutant selected in the step c as an input of the stacked long short-term memory network model and by taking the indoor pollutant data information of the train in the training set as an output of the stacked long short-term memory network model, thereby obtaining the deep learning model of the deterministic mapping relationship between the indoor pollutant concentrations and outdoor pollutant concentrations of the train.

7. The health protection method for passengers on a train in a polluted indoor environment according to claim 6, wherein a number of neurons in each layer of the stacked long short-term memory network model is obtained by optimization of a firefly algorithm, specifically comprising the following steps:
  1) Determine a fitness function;
  2) Perform initialization setting on the firefly algorithm;
  3) Arrange and archive all fireflies by fitness;
  4) Screen out an optimal firefly from a group as an individual leader; and
  5) determine a search frequency:
  if the search frequency meets a requirement, finish the firefly algorithm and output an optimal solution to determine a number of optimal neurons of the stacked long short-term memory network model; and
  if the search frequency does not meet the requirement, repeat the steps 3)-5) until the search frequency meets the requirement.

8. The health protection method for passengers on a train in a polluted indoor environment according to claim 7, wherein the step of generating the ventilation strategy of each carriage of the train in the step S6 is, specifically, to generate the ventilation strategy in the following rules:
  if $AO<\min(AI_R)$, it is deemed that an indoor air pollution degree of the train is lower than an outdoor air pollution degree of the train, and then an outdoor air circulating ventilation system is stopped and an indoor air circulating filtering apparatus is started, thereby preventing outdoor air from causing secondary pollution to an indoor environment of the carriage;
  if $AO>\max(AI_R)$, it is deemed that the indoor air pollution degree of the train is higher than the outdoor air pollution degree of the train, and then the outdoor air circulating ventilation system is started and the indoor air circulating filtering apparatus is stopped; and for any carriage, if it is determined that $AI_e>AI_{e+1}$ and $AI_e>AI_{e-1}$ it is deemed that an air pollution degree of a carriage e is higher than that of an adjacent carriage, and then air filtering strength of a ventilation system of the carriage adjacent to the carriage e is improved to reduce cross pollution between different carriages and to accelerate flowing and discharging of air pollutants out of the train; and
  if $\min(AI_R)<AO<\max(AI_R)$, it is deemed that the air pollution degree of some carriages is higher than the outdoor air pollution degree while the air pollution degree of still some carriages is lower than the outdoor air pollution degree; and then the outdoor air circulating ventilation systems of the carriages with the air pollution degree higher than the outdoor air pollution degree are started; and meanwhile, the outdoor air circulating ventilation systems of the carriages with the air pollution degree lower than the outdoor air pollution degree are stopped, and the indoor air circulating filtering apparatuses of the carriages with the air pollution degree lower than the outdoor air pollution degree are started;
  wherein, AO is a predicted result of outdoor AQI of the train, and $AI_R$ is a predicted result of indoor AQI of the R-th carriage of the train.

* * * * *